J. C. LONG.
TIRE ALARM.
APPLICATION FILED FEB. 21, 1916.
1,294,923.
Patented Feb. 18, 1919.
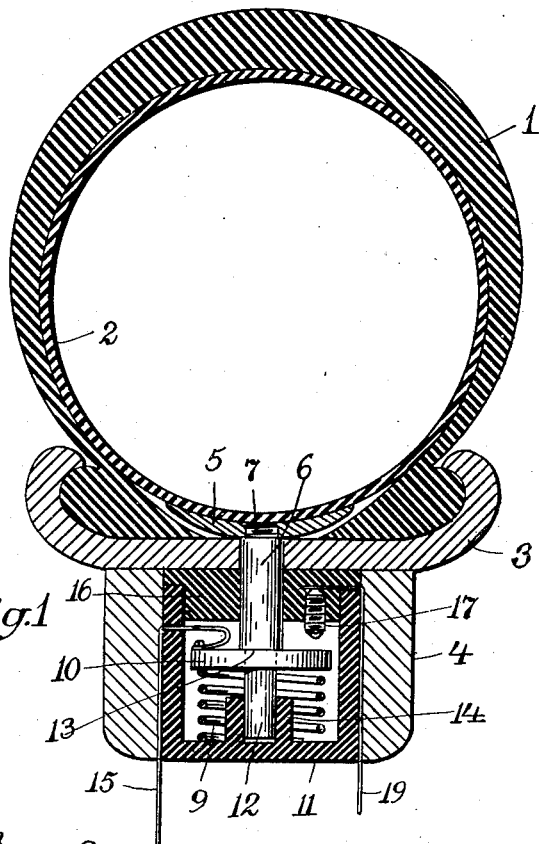
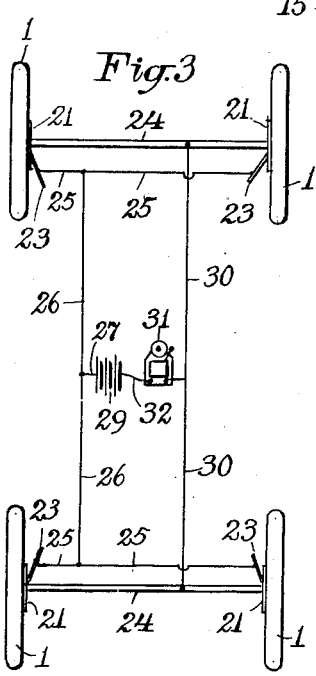
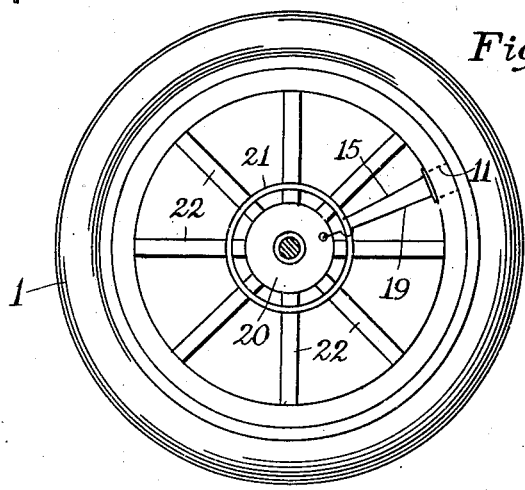
Inventor,
Jeremiah C. Long;
By A. B. Upham
Attorney.

UNITED STATES PATENT OFFICE.

JEREMIAH C. LONG, OF EVERETT, MASSACHUSETTS.

TIRE-ALARM.

1,294,923.      Specification of Letters Patent.      Patented Feb. 18, 1919.

Application filed February 21, 1916.   Serial No. 79,520.

*To all whom it may concern:*

Be it known that I, JEREMIAH C. LONG, a citizen of the United States, and a resident of Everett, in the county of Middlesex and Commonwealth of Massachusetts, have invented certain new and useful Improvements in Tire-Alarms, of which the following is a full, clear, and exact specification.

Previous to my invention, attempts have been made to construct devices for sounding an alarm when a pneumatic tire began to grow deflated, in order that such deflation should not occur without warning and the tire get badly cut and injured between the roadway and the rim.

These devices have all, however, been found somewhat complicated, easily gotten out of order and liable to be noisy, since the actuating alarm-current would be caused to be transmitted by the contact of a stationary member and a movable member carried by each wheel.

In my invention, I have no exposed mechanically operative members, but have located a pair of electrical contacts controlled by the tire within a closed housing in the wheel-felly, suitable circuits joining the contacts with a source of current and an alarm carried by the automobile.

Referring to the drawings forming part of this specification, Figure 1 is a transverse section of an automobile tire, rim and felly showing my contact devices connected therewith. Fig. 2 is a face view of a wheel showing a part of the circuit. Fig. 3 is a diagrammatic plan view of an automobile running gear, showing the alarm circuits.

The reference numeral 1 designates the clencher shoe of a well known type of pneumatic tire; 2 the inner tube; 3 the clencher rim, and 4 the felly of the wheel.

Between the inner tube 2 and the rim 3 is a saddle 5 in which the inner tube is strongly pressed by the compressed air within. This saddle is attached to the outer end of a stem 6, preferably by a threaded portion 7, and is strongly pressed against the inner tube by a helical spring 9 acting between a metal washer 10 and the bottom of the case 11. This washer is preferably mounted on the reduced portion 12 of the stem, and is pressed by the spring against the shouldered juncture 13 of the reduced and normal diameters of the stem.

The end of the stem is slidable in a socket 14 formed as a part of the case-bottom, to allow considerable longitudinal motion of the stem and saddle; and to the washer 10 is connected an end of a wire 15 which passes out through the side of the case 11 as shown in Fig. 1. In the thick cap 16 of the case is a threaded contact cap 17 whose inner end meets a wire 19 which passes out radially therefrom, as shown in the same figure.

The wires 15 and 19 being made parts of an electric circuit, the deflation of the inner tube permits the spring 9 to press the washer 10 into contact with the pin 17 and thereby to complete the circuit, while the full inflation of the inner tube holds the washer and pin apart and maintains a broken circuit.

For causing the deflation of the tire and the consequent engagement of the contacts 10, 17 to sound an alarm, I prefer to have one of the wires, as 19, grounded on the metal hub 20 of the wheel, as shown in Fig. 2, and to have the wire 15 connected with a metal ring 21 concentric with but insulated from the hub, as by fastening it to the wooden spokes 22. A suitably supported brush 23 carried by the adjacent axle 24 of each wheel, and wires 25, 26 connected with each brush and the pole 27 of the current source 29, compose the part of the circuit communicating with the wires 15, while the wire 30 connected with the axles 24 and an alarm bell 31 compose, with the metal work of the running gear, the remainder of the circuit, said bell being joined by a wire 32 with the other pole of the current source 29.

Consequently, the instant either of the tires become partially deflated, its contacts 10, 17 become engaged, and current flows from the source through a wire 26, a wire 25, a brush 23, a ring contact 21, a wire 15, washer 10, pin 17, wire 19, metal work of the running gear, wire 30, bell magnet 31, and wire 32 back to the current source. Until this circuit is again broken, as by inflating the tire, or switching off the current pending the repair of the injured tire, the alarm bell continues to sound its warning.

By having the casing 11, which is preferably of hard rubber to render it non-conducting, made water-tight so that no moisture can get within it, as indicated in Fig. 1, there is no danger of the contacts 10, 17 becoming accidentally short-circuited, and the chauffeur knows that the instant the alarm begins to sound a tire is badly leaking. If for no other reason than the unpleasantness of the loud ringing of the bell, he will at once stop and institute repairs.

In case the leakage is comparatively slight and is not easily discernible to the chauffeur's eye, all he needs to do is to put out of touch with the contact rings one after another of the brushes 23 until the stoppage of the alarm shows the wheel affected.

What I claim is:

The combination with a vehicle wheel having a pneumatic tire and a rim, of a non-conducting cylindrical shell adapted to be introduced radially through said rim and having a closed outer end, said shell being proportioned to have its outer end flush with the inner periphery of the rim, a non-conducting cover for the inner end of said shell, a stem slidably extending through said cover into contact with the tire, the portion of said stem opposite the tire being reduced to form a shoulder, a washer forming one contact mounted on said reduced portion, a helical spring abutting between said washer and closed end to press the stem and tire surface inward, and a contact supported by said cover adjacent said washer, the central portion of said closed end being extended and apertured for the reception of the reduced end of said stem, said spring surrounding said extended portion.

In testimony that I claim the foregoing invention, I have hereunto set my hand this 19th day of February, 1916.

JEREMIAH C. LONG.

Witness:
A. B. UPHAM.